3 Sheets—Sheet 1.
J. BARTA.
HARVESTER BINDER.
No. 114,749. Patented May 16, 1871.
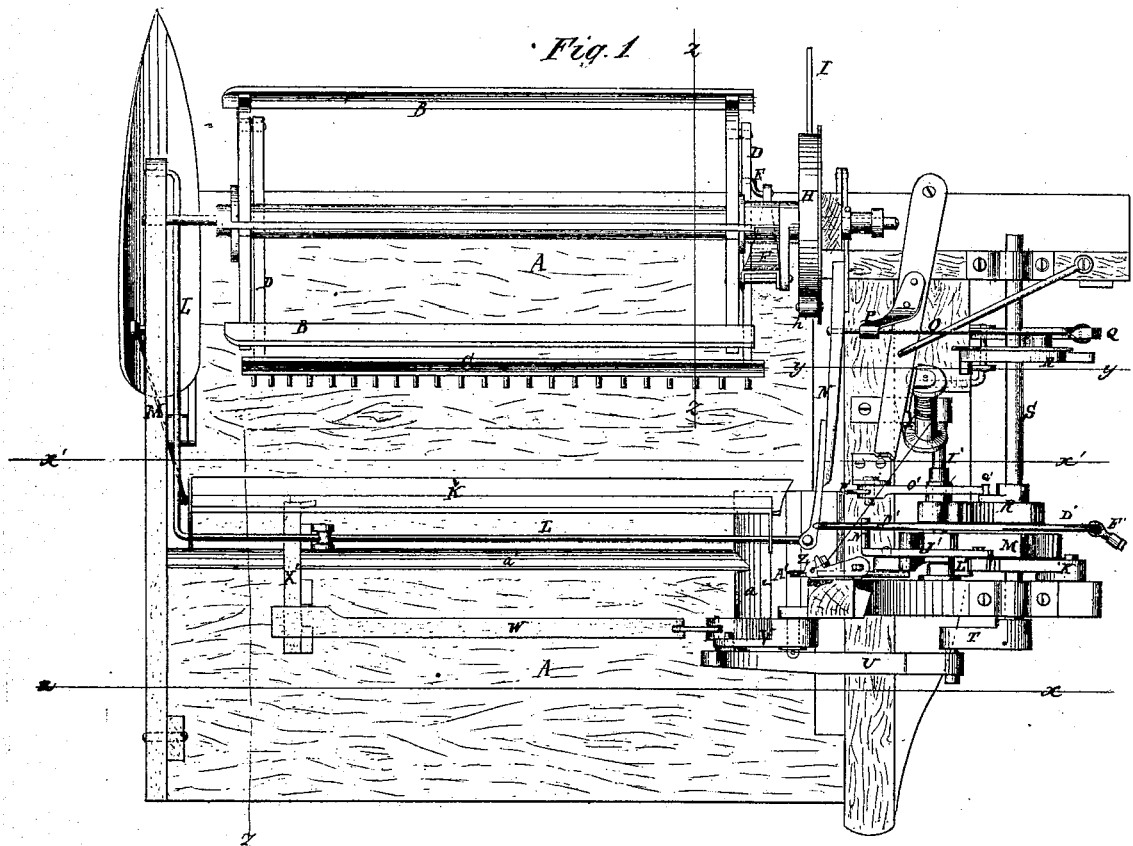
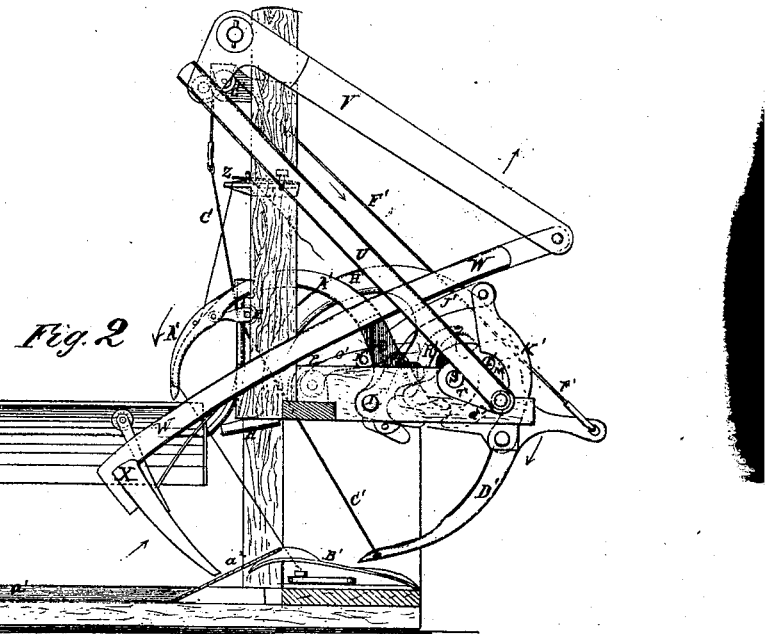
Witnesses:
Inventor:
Joseph Barta 3 Sheets—Sheet 2.
J. BARTA.
HARVESTER BINDER.
No. 114,749.  Patented May 16, 1871.
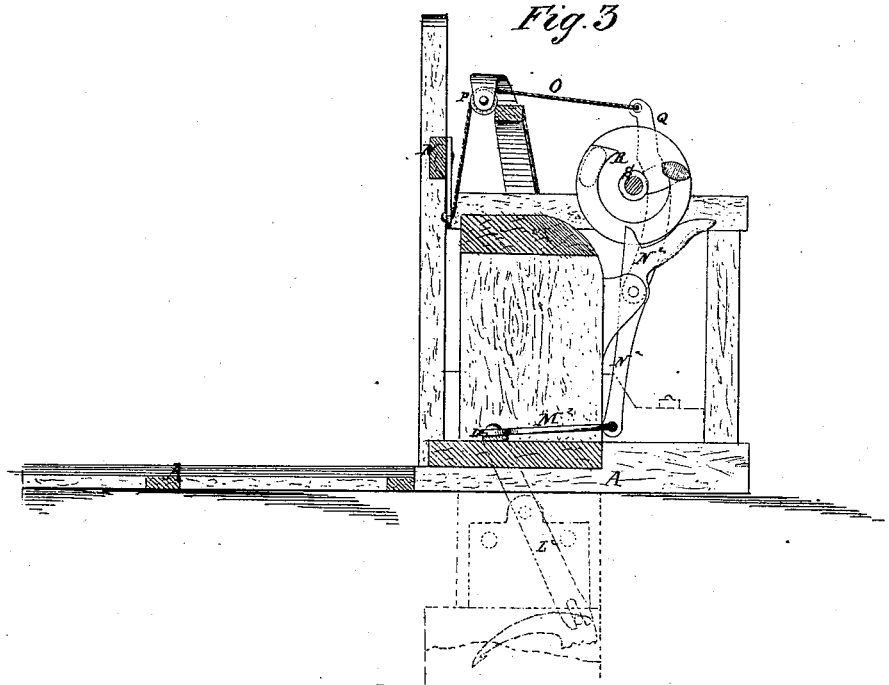
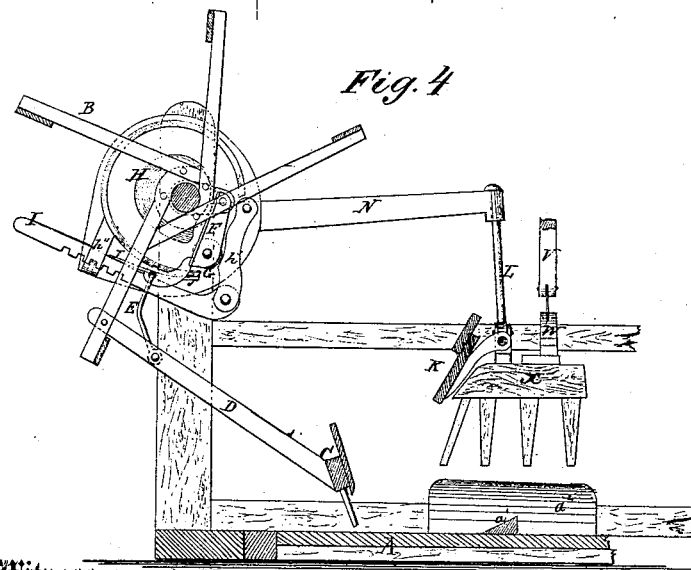
Witnesses:
A. W. Almquist
Wm. H. C. Smith
Inventor:
Joseph Barta
per Munn & Co
Attorneys.

3 Sheets—Sheet 3.

J. BARTA.
HARVESTER BINDER.

No. 114,749.   Patented May 16, 1871.

Witnesses:
A. W. Almqvist
Wm. H. C. Smith

Inventor:
Joseph Barta
Per
Attorneys.

United States Patent Office.

JOSEPH BARTA, OF LA CROSSE, WISCONSIN.

Letters Patent No. 114,749, dated May 16, 1871.

IMPROVEMENT IN HARVESTER-BINDERS.

The Schedule referred to in these Letters Patent and making part of the same.

*To all whom it may concern:*

Be it known that I, JOSEPH BARTA, of La Crosse, in the county of La Crosse and State of Wisconsin, have invented a new and useful Improvement in Binding Attachment for Harvesters; and I do hereby declare that the following is a full, clear, and exact description thereof, which will enable others skilled in the art to make and use the same, reference being had to the accompanying drawing forming part of this specification, in which—

Figure 1, Sheet I, is a top view of a harvester-platform to which my improvements have been attached.

Figure 2, Sheet I, is a rear view of the same, partly in section, through the line $x\ x$, fig. 1.

Figure 3, Sheet II, is a sectional view of the same taken through the line $y\ y$, fig. 1.

Figure 4, Sheet II, is a sectional view of the same taken through the line $z\ z\ z$, fig. 1.

Figure 5:
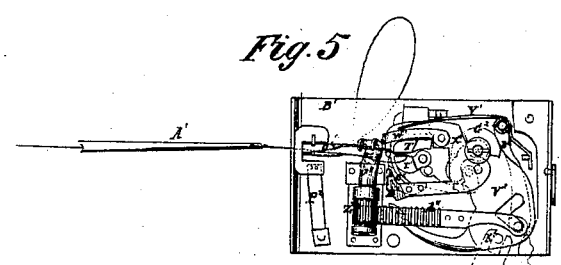

Figure 5, Sheet III, is an under-side view of the knot-tying device.

Figure 6:
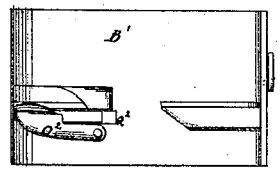

Figure 6, Sheet III, is a plan view of the top plate of the same.

Figure 8:
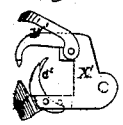
Figure 9:
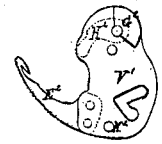
Figure 7:
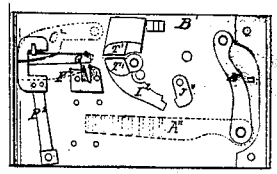
Figure 10:
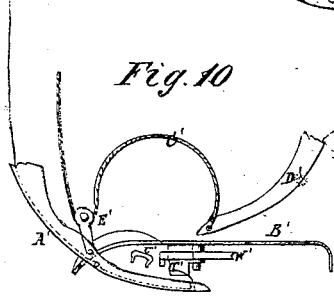
Figure 11:
Figure 12:
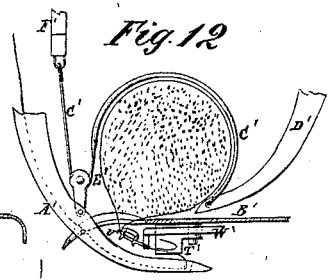
Figure 13:
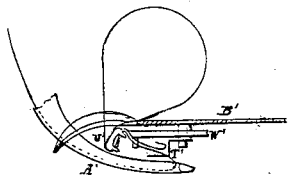
Figure 14:
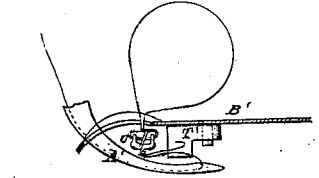
Figure 15:
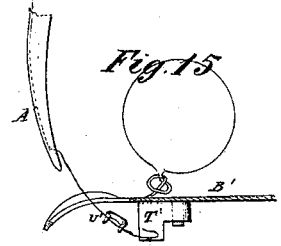
Figure 16:
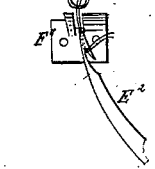

Figures 7, 8, 9, Sheet III, are views of parts of the knot-tying apparatus.

Figures 10, 11, 12, 13, 14, 15, 16, Sheet III, are views illustrating the movements of various parts in tying the knot.

Similar letters of reference indicate corresponding parts.

My invention has for its object to furnish an improved raking-and-binding attachment for harvesters, which shall be so constructed as to take the cut grain as it falls upon the platform, push it back, gather it into gavels, bind it securely, and push the bound sheaf from the machine, and which shall be effective and reliable in operation; and It consists in the construction and combination of the various parts of the apparatus, as hereinafter more fully described.

A is the platform of the machine, upon which the grain falls when cut.

B is the reel, which revolves in bearings in the framework of the harvester, and which is driven from the harvester by a chain in the ordinary manner.

C is a rake attached to the outer ends of two arms D, the other ends of which are pivoted to two of the reel-arms near their outer ends.

To one of the arms D, near its outer or pivoted end, is pivoted one end of a connecting-rod, E, the other end of which is pivoted to the rear end of an arm, F, the forward end of which is pivoted to one of the reel-arms; and to an arm riding upon the reel-shaft.

To the arm F is pivoted a friction-roller or wheel, G, which works in a cam-groove in a plate, H, attached to the reel-post, and through the center of which the reel-shaft passes.

The rear part $h^1$ of the outer wall of the groove or channel of the plate H is movable, and is pivoted at its upper end to the said plate H.

The lower end of the movable piece $h^1$ is pivoted to the rear end of a catch-bar, I, the forward end of which passes through a guide or keeper, $h^2$, attached to the plate H.

The lower edge of the bar I is notched to catch upon a catch formed in or attached to the keeper, $h^2$.

The bar I is held down upon the catch by a spring, J, attached to the plate H, and which presses down upon the upper edge of the bar I.

By this construction the rake C is carried around by and with the reel B in its revolution.

As the rake C strikes the platform A it moves back along said platform, pushing the cut grain back into position to be taken by the gathering-rake and gathered into gavels.

As the pulley G strikes the movable piece $h^1$ the rake C is raised in nearly a perpendicular direction, and is then carried around with the reel B.

By adjusting the position of the movable piece $h^1$ by means of the catch-bar I the distance that the rake C moves back along the platform may be regulated according to the length of the stalks of the grain being cut.

K is a bar or plate that supports the ends of the cut grain while the gavel is being gathered, to prevent the grain being cut from mingling with the grain being gathered into a gavel.

The bar or plate K is hung from and pivoted to a rod, L, and is held in an inclined position when lowered to receive the grain by a cord or chain, M, one end of which is attached to the outer end of the lower edge of the said bar or plate K, and its other end is attached to the frame of the machine or to an arm pivoted to said frame.

The bar or plate K is lowered to receive the grain, and again raised to allow the grain to drop to the platform A, by raising and lowering the said rod L.

The outer end of the rod L is bent upward and forward, and its end is pivoted to the frame of the machine a little below and in front of the reel-shaft.

The other or inner end of the rod L is attached to the rear end of an arm or lever, N, the forward end of which is pivoted to the frame of the machine a little below and in front of the reel-shaft.

O is a rope or chain, one end of which is attached to the arm or lever N.

The chain or rope O passes over a guide-pulley, P, pivoted to the frame-work of the machine at a higher elevation than the arm or lever N, and its other end is attached to the upper end of a lever, Q, the lower end of which is pivoted to a support attached to the lower part of the frame of the machine.

The lever Q is operated to raise the bar or plate K and its attachments by a projection of the cam R, attached to the shaft S, which revolves in bearings attached to the frame-work of the machine, and is connected with the driving mechanism of the harvester by suitable gearing, so as to be driven by said driving mechanism.

To the rear end of the shaft S is attached, or upon it is formed, a crank, T, to the crank-pin of which is pivoted the lower end of the connecting-rod U, the upper end of which is pivoted to the short arm of the elbow-lever V, which is pivoted at its angle to the upper end of a post attached to the frame of the machine.

To the lower end of the long arm of the lever V is pivoted the inner end of the handle W of the gathering-rake X, so that the said rake X may be moved back and forth across the platform A to gather the cut grain pushed back by the reel-rake C into a gavel.

The rake X is connected with the rod L, which serves as a guide to said rake in its forward movement, and supports it away from the platform in its outward movement, so that the said rake in its outward movement will not come in contact with the grain upon the platform.

The rake X descends to the platform A, just in the rear of the shoulder formed by the recess made in the outer end of the platform, to receive the caster-wheel, so that the said rake may pass down freely outside of the grain.

$a^1$ is a cleat, attached to the platform A beneath the rake X, to support the middle parts of the grain while being gathered into a gavel, to prevent the stalks of grain from getting beneath the rake-teeth while being gathered.

$a^2$ is an incline, up which the gavel is swept by the rake X to be bound.

Y represents the spool, upon which the binding-cord is wound, which is pivoted to the frame-work of the machine in such a position as to be out of the way, and which is provided with a rubber washer at one end, to prevent the cord from unwinding by the jar of the machine.

From the spool Y the cord passes through the guide-eyes Z, which are provided with a spring to give the necessary tension to the cord.

From the guide-eyes Z the cord passes along a groove in the convex edge of the curved finger $A^1$, and through an eye in the end of said finger.

As the machine is started the finger $A^1$ is moved downward and passes through a slot in the forward end of the top plate $B^1$ of the device for forming the knot, where the end of the cord is grasped and held by a pair of jaws.

The finger $A^1$ is then withdrawn, bringing the various parts of the binding device into the position shown in fig. 2, ready to receive the gavel.

As the gavel is forced into the binding device by the rake X it forces back the binding-cord and also the cord $C^1$.

The lower end of the cord $C^1$ is attached to the lower end of the curved finger $D^1$, which is curved in the opposite direction from the finger $A^1$.

The cord $C^1$ passes around a pulley, $E^1$, pivoted to the inner or concave side of the finger $A^1$, and its upper end is attached to the end of a rubber strap, $F^1$.

The rubber strap $F^1$ passes over a guide-pulley, $G^1$, attached to the upper part of the frame-work of the machine, and its other end is attached to a projecting arm formed upon the outer or concave side of the finger $D^1$.

The elasticity of the rubber strap $F^1$ allows the cord $C^1$ to adjust itself to and firmly hold different-sized bundles.

As the entering gavel forces back the binding-cord and the holding-cord $C^1$ the finger $A^1$ again descends, drawing the binding-cord about the bundle, and carrying it into the knot-tying device, where the knot is tied and the cord cut off, its end being again grasped and held ready for the next bundle.

While the knot is being tied the finger $D^1$ is withdrawn and the finger $H^1$, formed by extending the finger $D^1$ in the other direction, descends, and, as the cord is cut after the knot is tied, pushes the bundle from the machine.

The finger $A^1$ is pivoted to a short shaft, $I^1$, and to it is pivoted one end of a connecting-bar, $J^1$, the other of which is pivoted to the upper end of the bar or lever $K^1$, the lower end of which is pivoted to the frame-work of the machine.

The lever $K^1$ is operated to raise the finger $A^1$ at the proper time by a pin or projection, $L^1$, attached to the side of the cam $M^1$, attached to the shaft S, and which acts upon the rear end of the finger $A^1$ to force it down at the proper time.

Upon the lower end of the connection-bar $J^1$ is formed, or to it is attached, a projection or pin, $N^1$, which strikes against the lower edge of the finger $H^1$ as the finger $A^1$ is being raised, and raises the finger $H^1$, lowering, at the same time, the finger $D^1$ into position to receive and hold the bundle.

The finger $D^1$ is locked and held against the pressure of the gavel by the lock-bar $O^1$, which is held down by a spring, $P^1$, and takes hold of a pin or projection, $Q^1$, attached to the pivoting-arm of the fingers $D^1 H^1$.

As the shaft S revolves the cam R' raises the bar $O^1$ and unlocks the fingers $D^1 H^1$, and the cam $M^1$ raises the finger $D^1$ to release the bundle, and lowers the finger $H^1$ to push it from its place.

As the finger $A^1$ passes through the slot in the plate $B^1$ it passes close below the clamp T', and presses the end of the binding-cord between the jaws of said clamp, where it is held.

As the finger $A^1$ again enters the knot-tying apparatus after a gavel has been received it again passes beneath the clamp T', and presses the cord between the jaws of the said clamp and remains stationary while the knot is being tied, both ends of the cord being now drawn over the twister U'.

Motion is communicated to the knot-tying apparatus from the plate V'.

As the plate V' moves forward the two ends of the cord are grasped between the jaws of the movable clamp W', one of which jaws is formed up ... of the plate X', pivoted to the plate V'; an.. jaw is pivoted to said jaw and is held fc.. spring, Y'.

The movements of the plate X' are limit trolled by stops attached to the plate $B^1$.

As the movable clamp W' moves forward the two cords into the lips of the twister U ... revolution of which a loop is formed upon the said cord.

The twister U' works in bearings attached to the plate $B^2$, and upon its rear end is formed a small gear-wheel, Z', the teeth of which mesh into the teeth of the rack-bar $A^2$, which extends back along the under side of the plate V', and is pivoted to the end of the bar $B^2$, placed above the plate V', said pivoting-pin passing through a V-shaped slot in the plate V'.

The other end of the bar $B^2$ is pivoted to the plate $B^1$, as shown in fig. 7.

While the loop is being formed the cord is cut between the movable clamp W' and the holding-clamps T' by the cutting-blade C², which is pivoted to an arm of the plate X', as shown in fig. 8; to which arm is riveted a thin plate, D², which prevents the loop from slipping from the twister V' too soon, and which also prevents the cord from slipping through the hook while the knot is being drawn tight.

As the movable clamp W' moves forward it carries the ends of the cord within reach of the curved hook E², which is projected through the twister U', and consequently through the loop of the cord, and by which the ends of the cord are drawn through the loop, forming the knot.

The hook E² is formed upon or attached to the plate V', so as to be operated by the movement of said plate V'.

As the ends of the cord are drawn through the loop they enter a slit in a beveled plate, F², against which the knot is drawn tight, thus preventing the loop from following the hook E².

The armed plate X', with which the movable clamp W' is connected, is operated by a cam, G², attached to the plate V' and by stops attached to the plate B¹.

The knife C² is moved forward at the proper time by stops attached to the plate B¹, and with which the movement of the plate X' brings it in contact.

The movable jaw of the holding-clamp T' is released to allow the end of the cord to be drawn out by the movement of the movable clamp W' by the cam H² attached to the plate V', and which moves along the arm I² formed upon or attached to the said movable jaw of the holding-clamp, and pushes back the lock-bar or button J², which is moved back by the cam H², and is moved forward to again lock the bar by the advance of the pivoted bar B².

The cam H² rests against the arm I² and holds the jaw of the clamp steadily as it moves back to push back the lock-bar J² and as it moves forward, the said jaw being only released for a single instant after the cam H² has moved away from the arm I² and before the bar B² has pushed the lock-bar J² forward; but during this instant the end of the cord is drawn from the holding-clamp T' by the movement of the movable clamp W'.

All the movements of the knot-tying device are produced by a slight forward-and-backward movement of the plate V'.

To the plate V' is attached a pin, K², which enters a slot in the end of the lever L², which enters beneath the plate B¹, and is pivoted to the frame of the machine, as shown in figs. 3 and 5.

To the other end of the lever L² is pivoted one end of the connecting-bar M², the other end of which is pivoted to the lower end of the lever N².

The lever N² is pivoted to the frame-work of the machine and its upper end is made somewhat in the form of a shoe, as shown in fig. 3, so as to be moved in both directions by the cam R attached to the shaft S, as shown in fig. 3.

The hole in the plate B¹ through which the finger A passes is covered by a small cap-plate, O², pivoted to said plate, B¹, held forward to close said hole by the rubber spring P², and pushed back by the entering-finger A¹.

In the said hole is also secured a small rubber plate, Q², through which the entering-finger A¹ passes, and which, in connection with the cap, is designed to prevent the entrance of straws, dirt, &c.

Having thus described my invention,

I claim as new and desire to secure by Letters Patent—

1. The combination of the rake C, pivoted arms D, connecting-rod E, pivoted arm F, friction-wheel or roller G, channeled plate H, movable piece h¹, and adjustable catch-bar I with each other and with the reel B and platform A of a harvester, substantially as herein shown and described, and for the purpose set forth.

2. The combination of the plate or bar K, pivoted adjusting-rod L, arm or lever N, rope or chain O, guide-pulley P, lever Q, and cam R with each other and with the platform A, reel B, reel-rake C, and shaft S of a harvester, substantially as herein shown and described, and for the purpose set forth.

3. The gathering-rake X W, elbow-lever V, connecting-rod U, and crank T, in combination with the adjusting guide-rod L, platform A, reel-rake C, and shaft S, substantially as herein shown and described, and for the purpose set forth.

4. The finger A¹, holding-cord C¹, guide-pulley E¹, rubber strap F, guide-pulley G, curved fingers D¹ H¹, connecting-bar J¹, lever K¹, projection L¹, cam M¹, projection or pin N¹, lock-bar O¹, spring P¹, projection or pin Q¹, and cam R¹, in combination with each other, with the gathering-rake X W, shaft S, and with a knot-tying device, substantially as herein shown and described, and for the purpose set forth.

5. The knot-tying device, consisting of the holding-clamp T', twister U', plate V', movable clamp W', pivoted plate X', spring Y', gear-wheel Z', sliding rack-bar A², pivoted bar B², cutting-blade C², guard-plate D², curved hook E², slitted beveled plate F², cam G¹, cam H², arm I², and lock-bar J², said parts being constructed and operating in connection with the finger A¹, substantially as herein shown and described, and for the purpose set forth.

6. The combination of the pivoted lever L², connecting-bar M², and lever N², with the pin K² attached to the plate V' of the knot-tying device, and with the cam R attached to the shaft S, substantially as herein shown and described, and for the purpose set forth.

JOSEPH BARTA.

Witnesses:
JOHN F. WALTER,
H. E. HUBBARD.